(12) United States Patent
Humphrey et al.

(10) Patent No.: US 10,550,684 B2
(45) Date of Patent: Feb. 4, 2020

(54) OBSERVATION OF VIBRATION OF ROTARY APPARATUS

(71) Applicant: SCHLUMBERGER TECHNOLOGY CORPORATION, Sugar Land, TX (US)

(72) Inventors: Caroline Humphrey, Cambridge (GB); Ashley Bernard Johnson, Cambridge (GB); Paul Frederick Cilgrim Dickenson, Southampton (GB); Gokturk Tunc, Katy, TX (US); Michael Paul Barrett, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/031,147

(22) PCT Filed: Oct. 21, 2014

(86) PCT No.: PCT/US2014/061534
§ 371 (c)(1),
(2) Date: Apr. 21, 2016

(87) PCT Pub. No.: WO2015/061292
PCT Pub. Date: Apr. 30, 2015

(65) Prior Publication Data
US 2016/0251955 A1 Sep. 1, 2016

(30) Foreign Application Priority Data

Oct. 21, 2013 (GB) .................................. 1318594.7

(51) Int. Cl.
*E21B 47/00* (2012.01)
*E21B 47/12* (2012.01)
(Continued)

(52) U.S. Cl.
CPC .......... *E21B 47/0006* (2013.01); *E21B 17/20* (2013.01); *E21B 47/01* (2013.01);
(Continued)

(58) Field of Classification Search
None
See application file for complete search history.

(56) References Cited

U.S. PATENT DOCUMENTS

| 4,852,790 A | 8/1989 | Karlinski |
| 5,318,215 A | 6/1994 | Toya et al. |

(Continued)

FOREIGN PATENT DOCUMENTS

| EP | 1288691 A2 | 3/2003 |
| EP | 2327857 A1 | 6/2011 |

(Continued)

OTHER PUBLICATIONS

Taggart, M. J. et al., "New Real-Time Communication System Enhances Coiled-Tubing Operations", SPE 134389, presented at the SPE Annual Technical Conference and Exhibition held in Florence, Italy, 2010, 17 pages.

(Continued)

*Primary Examiner* — Jill E Culler

(57) ABSTRACT

The operation of rotary equipment carried on elongate structure such as coiled tubing extending into a borehole from the Earth's surface is carried out by providing at least one optical fibre extending downhole to the rotary equipment from the surface, using optical time domain reflectometry to operating the optical fibre as a distributed vibration sensor while the rotary equipment is in operation, and thereby observing vibration created by the rotary equipment.

19 Claims, 4 Drawing Sheets

(51) Int. Cl.
  *E21B 17/20* (2006.01)
  *E21B 47/01* (2012.01)
  *G01V 11/00* (2006.01)
  *E21B 7/00* (2006.01)
  *G01L 1/10* (2006.01)

(52) U.S. Cl.
  CPC .......... *E21B 47/123* (2013.01); *G01V 11/002* (2013.01); *E21B 7/00* (2013.01); *G01L 1/103* (2013.01)

(56) References Cited

U.S. PATENT DOCUMENTS

| | | | |
|---|---|---|---|
| 5,448,911 A * | 9/1995 | Mason | E21B 31/03 73/152.47 |
| 5,992,250 A * | 11/1999 | Kluth | E21B 17/003 254/134.4 |
| 7,152,685 B2 | 12/2006 | Adnan et al. | |
| 7,240,475 B2 | 7/2007 | Smeets et al. | |
| 7,277,162 B2 | 10/2007 | Williams | |
| 7,315,666 B2 * | 1/2008 | Van Der Spek | E21B 47/01 385/12 |
| 7,387,160 B2 * | 6/2008 | O'Shaughnessy | E21B 47/01 166/250.07 |
| 7,420,475 B2 | 9/2008 | Adnan et al. | |
| 7,597,142 B2 * | 10/2009 | Hartog | E21B 17/025 166/250.01 |
| 7,668,411 B2 | 2/2010 | Davies et al. | |
| 7,946,341 B2 | 5/2011 | Hartog et al. | |
| 8,150,226 B2 | 4/2012 | Casals et al. | |
| 8,589,136 B2 * | 11/2013 | Ertas | E21B 7/00 166/369 |
| 2003/0081917 A1 * | 5/2003 | Bussear | E21B 47/123 385/101 |
| 2005/0236161 A1 | 10/2005 | Gay et al. | |
| 2006/0132792 A1 | 6/2006 | Schultz et al. | |
| 2006/0272809 A1 | 12/2006 | Tubel et al. | |
| 2009/0071645 A1 | 3/2009 | Kenison et al. | |
| 2010/0006279 A1 | 1/2010 | Martinez et al. | |
| 2010/0038079 A1 | 2/2010 | Greenaway | |
| 2010/0282511 A1 * | 11/2010 | Maranuk | E21B 10/32 175/40 |
| 2011/0002795 A1 | 1/2011 | Brookbank | |
| 2012/0067118 A1 | 3/2012 | Hartog et al. | |
| 2012/0176250 A1 * | 7/2012 | Duncan | G01V 11/002 340/853.2 |
| 2012/0179378 A1 | 7/2012 | Duncan et al. | |
| 2012/0222900 A1 | 9/2012 | Rodney et al. | |
| 2013/0113629 A1 | 5/2013 | Hartog et al. | |
| 2013/0161098 A1 | 6/2013 | Maida, Jr. et al. | |
| 2014/0159550 A1 | 6/2014 | O'Bryan et al. | |
| 2015/0240614 A1 * | 8/2015 | Allen | E21B 7/00 175/40 |
| 2016/0125913 A1 | 5/2016 | Peng et al. | |

FOREIGN PATENT DOCUMENTS

| | | |
|---|---|---|
| GB | 2436142 A | 9/2007 |
| WO | WO2009148824 A1 | 12/2009 |
| WO | WO2012030814 A1 | 3/2012 |
| WO | WO2015026917 A1 | 2/2015 |
| WO | WO2015026919 A1 | 2/2015 |

OTHER PUBLICATIONS

Search Report and Written Opinion of International Patent Application No. PCT/US2014/061534, dated Apr. 17, 2015, 11 pages.
Exam Report of United Kingdom Patent Application No. 1318594.7 dated Mar. 27, 2017, 3 pages.
Exam Report of United Kingdom Patent Application No. 1318594.7 dated Aug. 30, 2017, 3 pages.
Exam Report of United Kingdom Patent Application No. 1318594.7 dated Feb. 6, 2018, 3 pages.
Search Report of United Kingdom Patent Application No. 1318594.7 dated Apr. 4, 2014, 3 pages.
Exam Report of United Kingdom Patent Application No. 1318594.7 dated Jul. 18, 2018, 3 pages.
Exam Report of United Kingdom Patent Application No. 1318594.7 dated Apr. 11, 2018, 4 pages.

* cited by examiner

OBSERVATION OF VIBRATION OF ROTARY APPARATUS

BACKGROUND

A number of operations within a borehole can be carried out with coiled tubing which is temporarily inserted into the borehole from the surface. The tubing can serve as a pipeline for fluid which is being delivered into the borehole and/or can carry equipment attached to the downhole end of the tubing. Some operations make observations or measurements. For example an appropriate sensor fitted to the bottom end of coiled tubing can measure natural radioactivity from the surrounding rock formation. Communication from the sensor at the bottom end of coiled tubing to the surface can be provided by an electrical cable or can be provided by an optical fibre, with signals from the sensor converted into light signals directed along the optical fibre. By way of example Society of Petroleum Engineers paper SPE134389 describes the use of optical fibre to provide communication from a downhole position sensor to the surface.

For some operations, a hydraulic motor and a cutting tool such as a drill bit, a mill or a reamer, are fitted to the downhole end of the coiled tubing so that fluid pumped down the tubing powers the hydraulic motor which in turn rotates the cutting tool. A hydraulic motor and a rotary cutter which is a mill may for instance be used to mill through a packer or plug temporarily placed in a borehole to close off one part of the borehole from another. For example US2009/0071645 mentions a wellbore tool which may comprise a milling bit driven by a hydraulic motor at the bottom end of tubing. A load detection sub assembly at the bottom end of the tubing can be used to detect local changes indicative of bit stalling. Data from this sub assembly and from other sensors downhole is communicated to the surface by means of a communication line which is optical fibre.

SUMMARY

The invention disclosed herein provides a method of monitoring the operation of rotary equipment carried on an elongate element such as coiled tubing extending into a borehole from the Earth's surface, comprising
  providing an optical fibre extending down the elongate element from the surface to the rotary equipment,
  operating the optical fibre as a distributed vibration sensor while operating the rotary equipment and
  observing and/or analysing vibration from the rotary equipment detected by the sensor.

Using an optical fibre as a distributed vibration sensor is known in itself. Operating the optical fibre(s) as a distributed vibration sensor may be carried out with an optical time domain reflectometry (OTDR) system which transmits pulses of coherent light from a laser into the at least one optical fibre. Light is then scattered back from points distributed along the fibre where there are slight variations in refractive index or other variations or imperfections in the material of the fibre. The backscattered light is received at a detector.

The time for the light to return to the detector depends on the distance to the detector from the point at which the light was scattered and so the detector receives a pattern of reflections from points distributed along the fibre. If the optical fibre remains undisturbed, a succession of pulses of light transmitted along the fibre will produce a succession of identical backscattering responses. However if the optical fibre is subjected to vibration, there is strain and the resultant change in the fibre length (even though it is very small) can be seen as a change in this pattern of back scattering. This is capable of detecting the very small changes in a fibre when it is subjected to vibration. Processing of the received signals provides an observation of any vibration taking place and can show both the magnitude of vibration and the location along the fibre at which it occurs.

The OTDR system may transmit a succession of pulses, receive backscattered light from the pulses and make a comparison between the backscattered light (or information derived from the backscattered light) from different transmitted pulses in order to detect variations in the backscatter and hence observe small strains on the fibre which may be brought about by vibration. In some OTDR systems the backscattered light is coherent Rayleigh noise.

This use of an optical fibre as a distributed vibration sensor has typically taken place in applications where vibration to be detected may occur at any point along the fibre.

Examples include monitoring marine risers as mentioned in U.S. Pat. No. 7,277,162 and monitoring pipelines and wellbores for acoustic noise in the vicinity of the fibre as mentioned in U.S. Pat. No. 7,946,341.

The times of flight for a transmitted light pulse to travel along an optical fibre and for backscattering to reach the detector are of course very short indeed because travel is at the speed of light along the optical fibre. Consequently it is possible to transmit many pulses of light and receive backscattering from them within a short time. There may, for example, be more than 1000 pulses transmitted in a second.

A single observation of strain at locations in the fibre can be made by comparing responses from a plurality of light pulses transmitted within a short time such as less than one second. The OTDR system may make repeated observations of strain over as long a period of time as may be desired, with each observation using backscattering from a plurality of light pulses transmitted within a short time.

In some embodiments of the present invention, the optical fibre(s) may extend within coiled tubing or some other elongate element capable of being extended into a borehole as a means of placing and operating a rotary cutting tool. The optical fibre(s) may be used for more than one function. For instance optical fibre(s) may be used as a communication link to carry information to the surface from discrete sensors located at the bottom end of the coiled tubing as well as being operated as a distributed vibration sensor. The communication link can be two-way, also serving to carry control signals from the surface to downhole tools. The optical fibre(s) may also be used as distributed temperature sensor to observe temperatures at multiple points between the surface and bottom ends of coiled tubing. The optical fibre(s) may possibly be used as a distributed vibration sensor to observe vibration occurring at any point between the surface and the bottom end of the fibre(s) coiled tubing but an alternative is that observation may be restricted to vibrations occurring below a chosen subterranean depth. These would be observed with a distal end portion of the fibre and the observation system may be arranged to selectively receive backscattering from the distal portion of the fibre while discarding or ignoring any back scatter from parts of the optical fibre closer to the detector.

If the fibres in tube 24 are used for more than one purpose, the utilizations of the fibres may be switched from one function to another in turn. For example operation as a vibration sensor might alternate with operation as a communications link and/or operation as a distributed temperature sensor. If this is done the periods of time dedicated to each utilization may be short, such as less than one second. It is also possible that a plurality of fibres within tube 24 can include fibres of different types and/or fibres used for different purposes. A possibility is that the tube 24 could contain at least one single mode fibre and at least one multimode fibre, with the surface end of the multimode fibre(s) connected to a system (which may be an OTDR system) for using the fibre(s) as a distributed temperature sensor while the single mode fibre(s) are connected to a separate OTDR system for vibration sensing.

DETAILED DESCRIPTION

Figure 1:
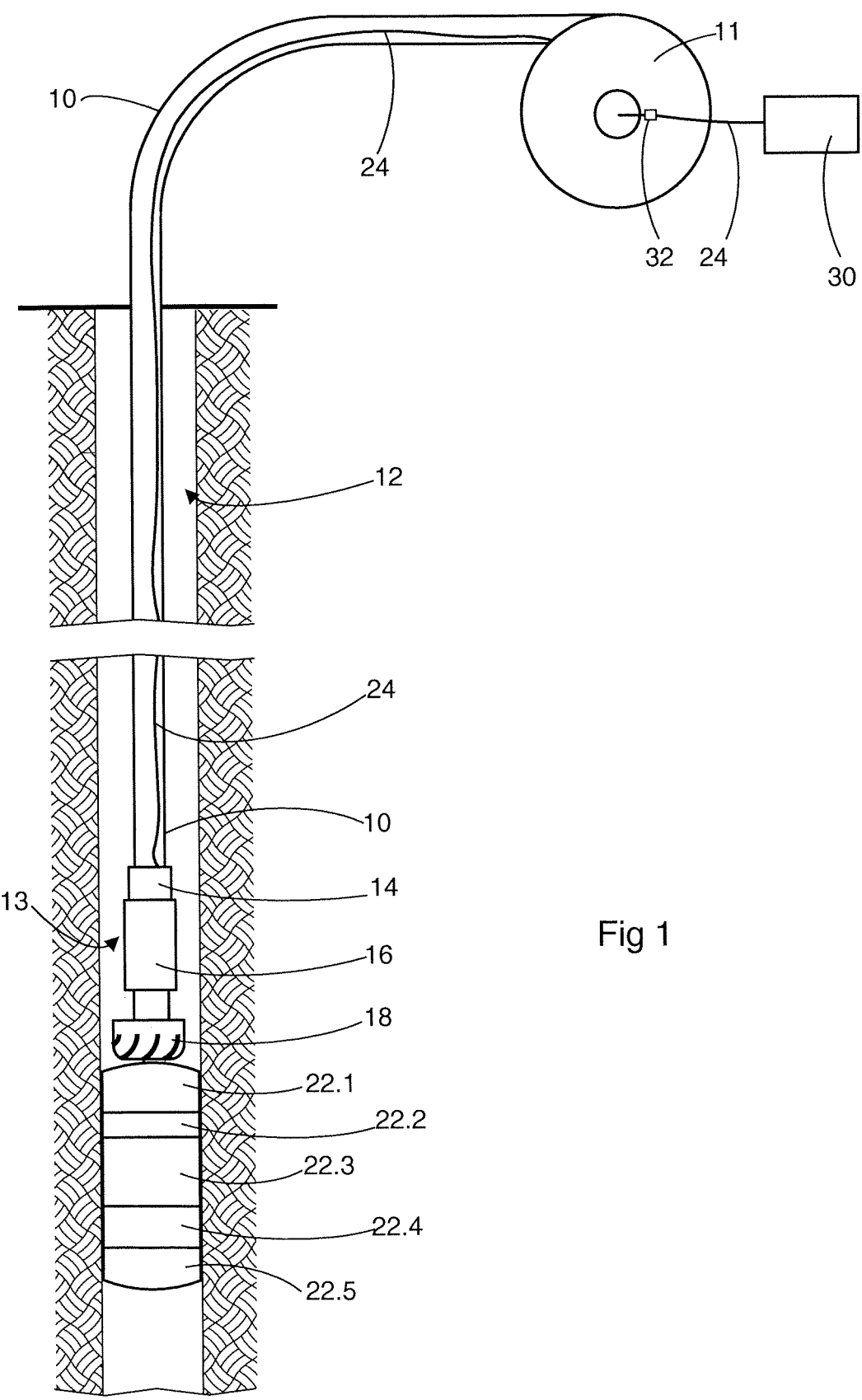
FIG. 1 is a diagrammatic view of coiled tubing inserted into a borehole.

As shown by FIG. 1, coiled tubing 10 from a spool 11 is inserted into a borehole 12 and is connected at its downhole end to a downhole equipment assembly 13 which includes a connector 14, hydraulic motor 16 and a rotary cutting tool which in this illustration is a milling cutter 18. The milling cutter 18 is about to be used to mill through a packer 22 which is made of a number of different materials, here arbitrarily illustrated as glass fib re composite 22.1 and 22.3, cast iron 22.2, rubber 22.4, and phenolic resin 22.5.

The connector 14, motor 16 and milling cutter 18 must of course be attached to the end of the coiled tubing 10 before it is inserted into the borehole. At this stage a protective steel tube 24 enclosing a plurality of optical fibres is inserted into the coiled tubing 10. A single optical fibre within the tube 24 would be enough, but providing a small plurality of optical fibres within the protective tube 24 is a precaution against the possibility that a fibre breaks or otherwise ceases to function.

Enclosing optical fibres within a protective metal tube has been known for a number of years. Methods for enclosing fibres in this way are disclosed in a number of documents including U.S. Pat. Nos. 4,852,790, 5,318,215, EP1,288,691 and U.S. Pat. No. 8,150,226 the disclosures of which are included herein by reference. The tube 24 enclosing optical fibres may be placed inside the coiled tubing using flow of fluid pumped through the tubing to convey the tube 24 along the coiled tubing 10 while it is still on its spool 11 at the surface. Placing a tube with enclosed optical fibres inside coiled tubing is described in U52005/0236161 and also in U.S. Pat. No. 7,152,685, the disclosures of which are included herein by reference.

Figure 2:
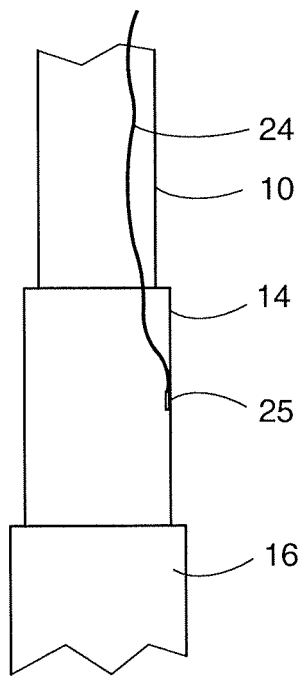
FIG. 2 is a detail view showing a downhole termination.

As shown by FIG. 2, the downhole end of tube 24 is sealed into a termination 25 which is secured within the connector 14 at the downhole end of the coiled tubing, thus anchoring the downhole end of the tube 24 relative to the downhole end of the coiled tubing 10. If the optical fibre is to be used solely for vibration sensing the downhole termination 25 on the tube 24 can be a non-reflecting fibre optic termination which seals the end of the tube 24. It is also possible that the termination 25 seals the end of the tube 24 but does not provide an optical termination, the optical fibre(s) in the tube 24 simply finishing at a cut end.

Figure 3:
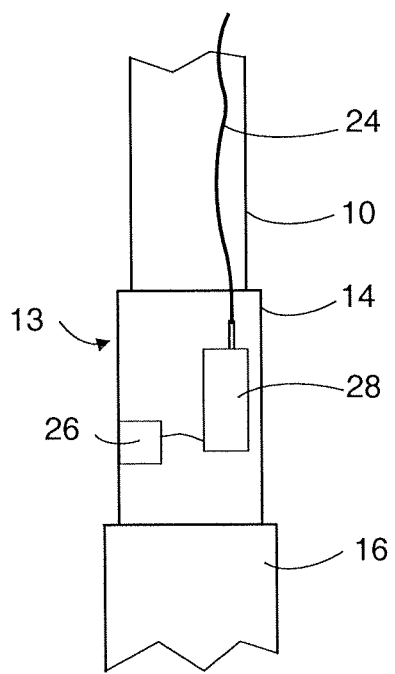
FIG. 3 is a detail view showing a different downhole termination.

FIG. 3 shows another possibility. The equipment assembly 13 includes one or more sensors 26 which are electrically connected to an electronics package 28 which encodes electrical signals from the sensors into light signals which are transmitted to the surface along the optical fibres in tube 24. The tube 24 is therefore terminated with an optical coupling to the light output from electronics package 28 which is attached to the connector 14, thus anchoring the downhole end of tube 24. Termini and optical couplings for optical fibres are commercially available. One supplier is Amphenol Fibre Systems International, Allen, Tex.

The surface end of the tube 24 containing optical fibre is anchored to the coiled tubing 10 at or near the upper end of the coiled tubing 10. The steel tube 24 is thus secured at the surface and downhole ends of the coiled tubing but between the surface and downhole ends the tube 24 is loose within the coiled tubing 10.

Figure 4:
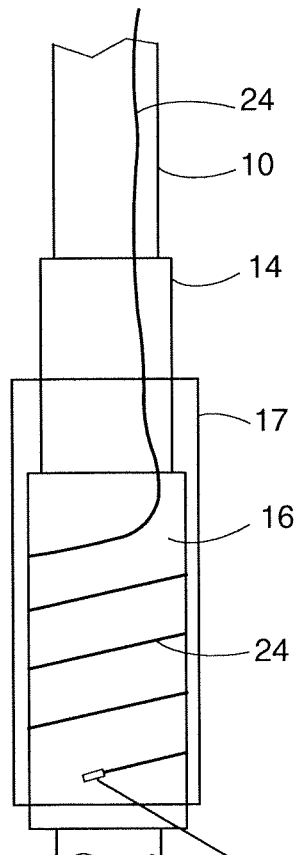
FIG. 4 is a further detail view showing a different downhole arrangement.

FIG. 4 shows a further possibility for the arrangement downhole. The tube 24 containing optical fibres is extended beyond the connector 14. It is wound helically around the exterior of the hydraulic motor 16 and covered by a protective shroud 17 so as to protect this part of the tube 24 from cuttings carried in the drilling fluid flowing up from the milling cutter 18 around the exterior of the motor 16. The tube 24 is terminated at 25. This arrangement provides a length of optical fibre close to the motor, so that this length of fibre will be subjected to the vibration of the motor and can be used to observe the rotational speed of the motor.

When the coiled tubing 10 and downhole assembly 13 have been extended down into the borehole, the optical fibres within the tube 24 need to be connected at the surface to an operating unit 30 which includes a laser to direct light pulses into the fibres, a detector for the reflected light and controlling and processing electronics. The operating unit 30 will also receive light signals from the electronics package 28 if there are sensors 26 in the downhole assembly 13.

There are several possible arrangements for mechanical and optical connections at the surface. The surface end portion of the tube 24 may be led out from the coiled tubing through a pressure seal to an optical coupling 32 on the spool. The surface unit 30 could then be attached to this optical coupling 32 after the coiled tubing 10 and downhole equipment assembly 13 have been placed in position in the borehole. This may be facilitated by locating the optical coupling 32 on or near the axis of the coiled tubing. Another possibility is that the surface unit 30 is mounted on the coiled tubing spool 11, so that the unit 30 can operate while the coiled tubing spool is rotating. A further possibility is that the surface unit is divided into two parts: a first part is mounted on the coiled tubing spool 11 and contains at least a laser light source and a light detector while a static second part contains electronics for controlling operation and recording processing received signals.

Connection between the first part mounted on the spool 11 and the static second part may be via a wireless link. Such a wireless link may be similar to an arrangement using a wireless link to an electric cable within coiled tubing as described in U.S. Pat. No. 7,240,475, the disclosure of which is also included herein by reference.

Figure 5:
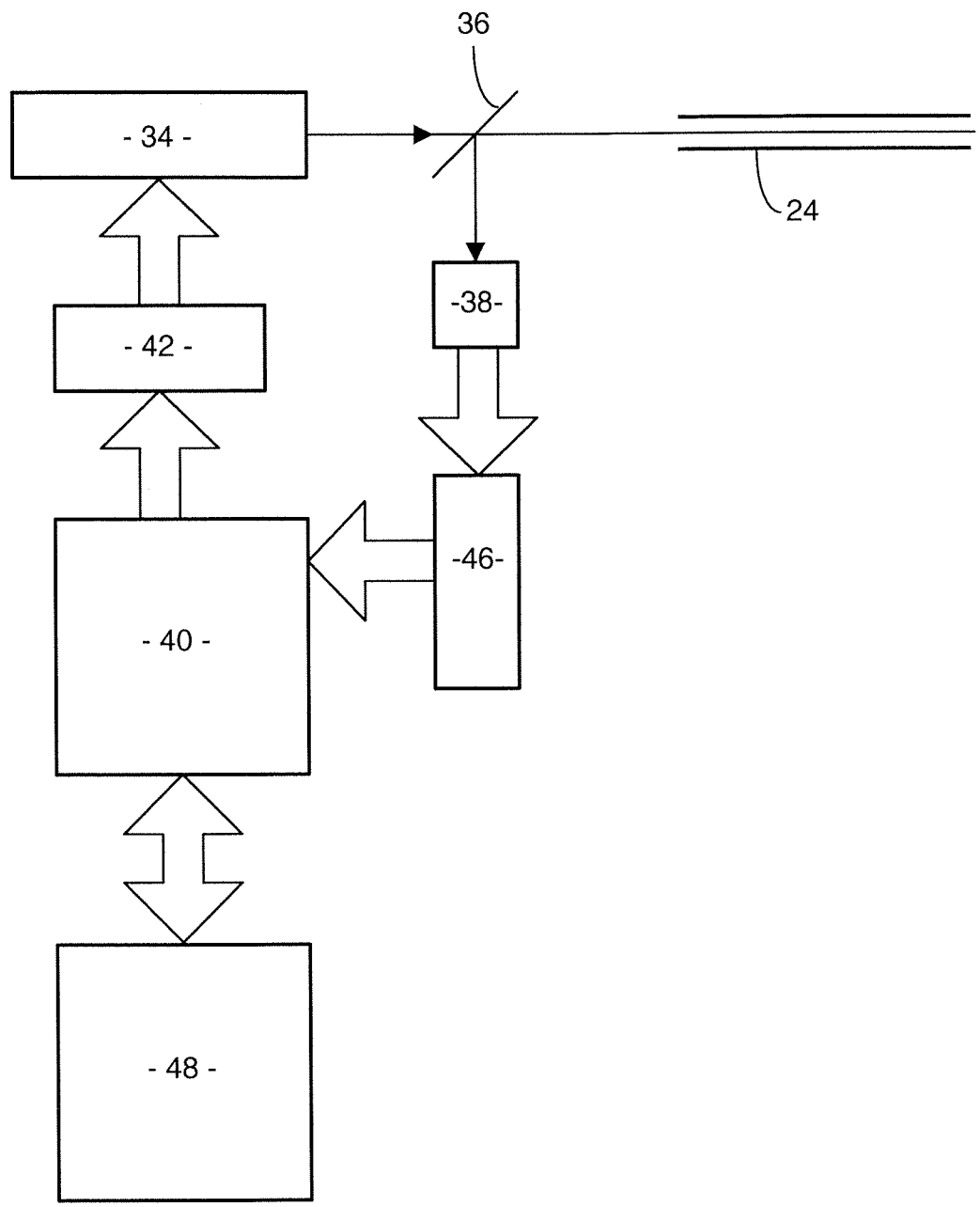
FIG. 5 diagrammatically shows parts of an OTDR system.

As indicated diagrammatically by FIG. 5, the surface unit 30 contains an optical time domain reflectometry (OTDR) system for operating the fibres in tube 24 as a distributed vibration sensor. This system has a laser 34 as light source for transmitting light into the optical fibres in tube 24, a beam splitter 36 for diverting backscattered light returning along the fibres and a photodetector 38. The controlling electronics is a computer 40 incorporating output interface circuitry 42 to control the laser 34, input interface circuitry 46 to receive signals from the photodetector 38 and a hard drive 48 for storing received signals or data derived from them.

There are a number of OTDR systems suitable for carrying out vibration sensing.

U.S. Pat. No. 7,668,411 describes a system in which the backscatter is coherent Rayleigh noise (CRN) and the optical fibre is a multimode fibre. This document mentions that CRN was previously used in a system with a single mode fibre.

U.S. Pat. No. 7,946,341 describes an OTDR system which uses an optical fibre as distributed interferometer. As the document explains, the pulse of light is made to have coherence time longer than its duration so that Rayleigh noise scattered from different scattering sites can interfere and the signals received by the detector will show phase at points along the optical fibre.

US2012/067118 describes a system which transmits pulses of coherent light from a narrowband source and mixes the backscattered Rayleigh signals with a second coherent optical signal so as to generate intermediate frequency (IF) signals. It is then possible to determine phase of these IF signals associated with locations along the optical fibre. The determination of phase may be done by means of analogue circuitry or it may be done by converting the signals to digital form with a fast analogue to digital converter and processing the digitized signals. The difference in phase between locations separated by at least one pre-defined distance interval along the fibre is calculated.

Changes in the optical fibre as result of vibration or other movement can then be detected as change in the calculated phase differences associated with locations along the fibre.

A further development of this approach is disclosed in US2013/0113629 which describes a system in which the transmitted light pulses are at multiple frequencies.

These documents: US2013/0113629 US2012/067118 U.S. Pat. Nos. 7,946,341 and 7,668,411 are all incorporated herein by reference.

An OTDR system as described in US2012/067118 or US2013/0113629 has better signal to noise than some other systems and may be used in embodiments of the present invention. It may be stated as a system which: provides a first optical signal output from an optical source in a first optical path and provides a second optical signal output from the optical source in a second optical path; modulates the first optical signal to generate a plurality of pulses of light; transmits the pulses along the at least one optical fibre; mixes Rayleigh backscatter signals with the second optical signal to generate intermediate frequency (IF) signals; determines phase of the IF signals at a plurality of locations along the optical fibre; and detects change along the length of the optical fibre based on differences in the determined phases across a selected interval between the plurality of locations.

Some OTDR systems transmit pulses of light and receive backscatter from each individual pulse, separately from backscatter from other pulses. However, there are also OTDR systems which transmit a group of pulses of light, so closely spaced that there is interference between backscatter from one pulse and backscatter from at least one other Although there are a number of OTDR systems which may be used, including those mentioned above, a general characteristic is that the response from one or a group of pulses of transmitted light will provide a single observation of a parameter, which may be amplitude, phase, or phase difference of back scattering at a succession of locations along the fibre. If a number of such observations are made while there is disturbance of the fibre by vibration the observations will differ from one another (because the backscattering of different transmitted light pulses will differ). Recording and comparing a number of these observations reveals the locations where strain of the fibre is occurring and magnitude of change or rate of change in the individual observations provides a measure of the magnitude of the strain. As mentioned above, data to provide one observation of location and magnitude of strain can be obtained very quickly, such as in less than one second.

The OTDR system may be operated to make such observations of location and magnitude of strain repeatedly over a longer period of time, such as more than one second or more than one minute. The resulting data can be used to obtain an observation of a pattern of vibration or of a vibration frequency. Data obtained from repeated observations may be presented as a three dimensional plot with location along the fibre on one axis, time (longer than the time for the OTDR system to collect data for one measurement) along a second axis and magnitude of strain on the third axis. However, it is often more convenient to present the data as a two-dimensional diagram with location along the fibre on one axis, time along a second axis and the magnitude of strain as colour on the diagram.

Figure 6:
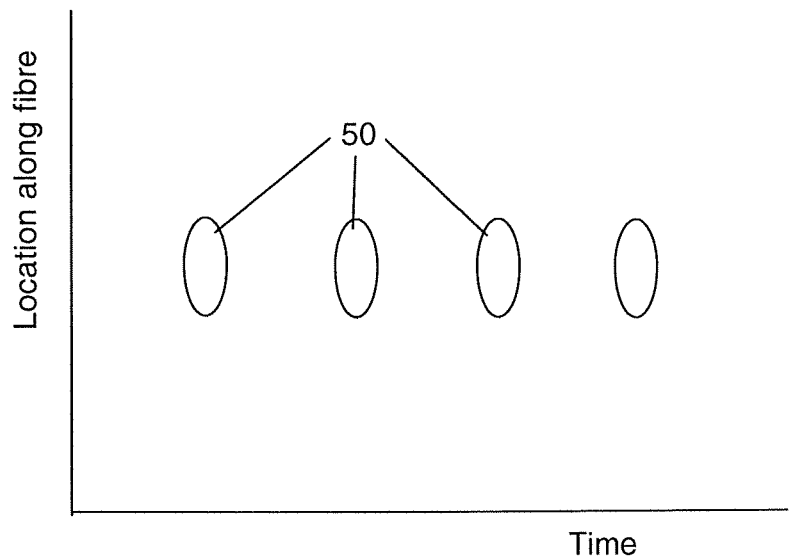
FIGS. 6 and 7 show possible displays of information obtained.

We have found that rotation of a pump or motor produces strain at regularly repeated intervals. FIG. 6 is plot of hypothetical data showing this. The circles 50 would appear as bright spots of colour on a diagram using brightness of colour to represent magnitude of strain.

Figure 7:
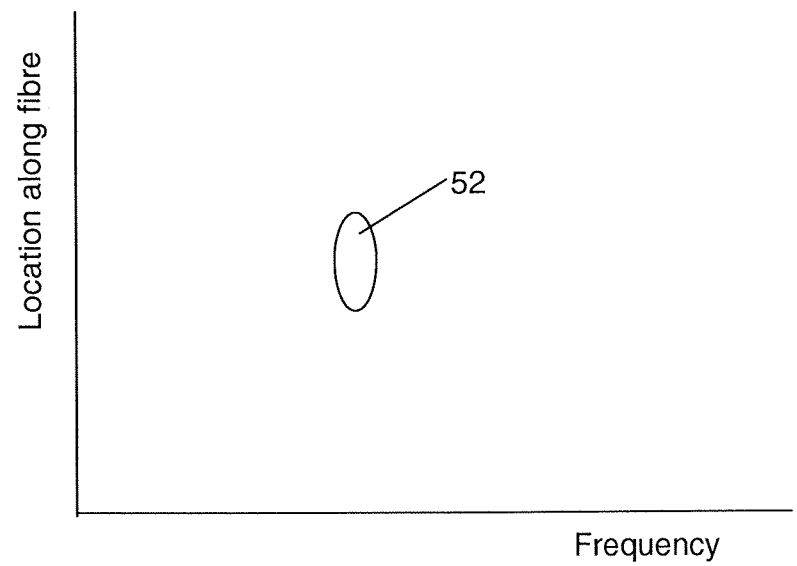

Other sources of vibration may produce a more complex pattern of colour on such a diagram. Interpretation may be assisted by making a Fourier transform of the data for each location along the fibre. The transformed data shows intensity of strain at different frequencies. It can be shown on a diagram with location along the fibre on one axis, frequency on the other axis and the energy in the vibration represented as colour. FIG. 7 shows the hypothetical data of FIG. 6 transformed in this way. The main frequency of vibration appears as a bright area 52 at a range of locations along the fibre.

Observation of vibration may be used in a number of ways. In the embodiment shown by FIG. 1, the milling cutter 18 will produce vibrations as it mills through the plug 22. The OTDR system will observe the vibrations as a pattern of frequencies at the downhole end of the optical fibres in tube 24 and also over some distance above the end of this tube 24. The observed pattern will depend on parameters including the speed of the milling cutter 18, the axial force on it (weight on bit) and the nature of the material which is being cut. The observed pattern may be expressed as a pattern of vibration frequencies or expressed as a pattern of vibration frequencies and the locations along the fibre at which they are observed. This pattern may be sufficiently complex that it is not feasible to make a direct interpretation as a measurement of these parameters but the pattern may nevertheless provide a distinctive "signature" associated with the combination of parameters. When one of these parameters changes, for instance when the cutter 18 reaches the end of the section 22.1 of glass fibre composite and starts to mill cast iron 22.2 the signature will change and this change will inform the operator at the surface that it is the moment to change to a rotation speed and weight on bit which is suitable for milling the cast iron section 22.2 of the plug. For this the data from the OTDR system will be processed in something approaching real time and an output will be displayed to a human operator. It would also be possible for the output to be sent to an automatic control system for the hydraulic motor and milling bit.

The apparatus shown in FIG. 4 allows the rotation of the hydraulic motor to be distinguished from other vibration, because it will be observed most strongly on the part of the optical fibre wound around the motor. The observed rotational speed can be displayed or sent to a control system, so that if the motor stalls, a human operator or the control system can take weight off the milling bit and lift the coiled tubing slightly to allow the motor to restart.

It is also possible that data gathered by the OTDR system might be recorded and then processed later. This could be useful for quality assurance. For example, if the milling bit was used to mill through a plug of asphaltene which had formed, the vibration while milling asphaltene would be distinctively different from vibration if the milling bit hit the well casing. Monitoring of vibration as described above followed by processing of data at a later time could reveal whether, and for how long, the milling bit was striking the casing, thus making it possible to show whether, or not, the asphaltene had been milled out without damage to the casing of the borehole.

Where the observed pattern of vibration is a complex "signature", observed signatures associated with known circumstances may be recorded in a database so that circumstances giving an observed signature at a later time may be identified by matching the signature against those in the database.

The above description is given by way of example and other arrangements may be employed. Enclosing optical fibres in a protective tube has benefits but it would be possible to use fibres or a single fibre with some other enclosure or without any enclosure other than the coiled tubing. Optical fibres may be single mode or multimode. It is also possible that the backscatter may be enhanced by inclusion of weak reflectors within the fibre, such as fibre Bragg gratings, mechanical splices or small bubbles deliberately introduced in fusion splices.

The invention claimed is:

1. A method of monitoring the operation of rotary equipment carried on elongate structure extending into a borehole from the Earth's surface, comprising:
    providing at least one optical fibre extending downhole to the rotary equipment from the surface, the rotary equipment including a downhole motor coupled to a cutting tool;
    operating the optical fibre as a distributed vibration sensor while operating the rotary equipment and using the downhole motor and cutting tool to mill materials within the wellbore, the materials within the wellbore including a plug positioned above a downhole end of the wellbore; and
    observing vibration created by the rotary equipment, which includes:
        detecting a change from a first signature of vibration of the downhole motor to a second signature of the vibration of the downhole motor;
        correlating the change from the first signature to the second signature with a change in the materials of the plug being milled by the cutting tool; and
        in response to the change from the first signature to the second signature, recommending a change in at least one of rotation speed or weight on bit;
    wherein operating the optical fibre as a distributed vibration sensor is carried out with an optical time domain reflectometry system capable of:
        transmitting pulses of coherent light into the at least one optical fibre; and
        detecting backscattered light which is coherent Rayleigh noise.

2. The method of claim 1 wherein the elongate structure is coiled tubing.

3. The method of claim 1 wherein the at least one optical fibre extends downhole inside the elongate structure.

4. The method of claim 1 wherein the at least one optical fibre is single mode optical fibre.

5. The method of claim 1 wherein the at least one optical fibre is enclosed in a protective tube.

6. The method of claim 1 wherein the optical time domain reflectometry system:
    provides a first optical signal output from a narrowband optical source in a first optical path and provides a second optical signal output from the narrowband optical source in a second optical path;
    modulates the first optical signal to generate a plurality of pulses of light;
    transmits the pulses along the at least one optical fibre;
    mixes Rayleigh backscatter signals with the second optical signal to generate intermediate frequency (IF) signals;
    determines phase of the IF signals at a plurality of locations along the optical fibre; and
    detects change along the length of the optical fibre based on differences in the determined phases across a selected interval between the plurality of locations.

7. The method of claim 1 wherein processing data from the optical time domain reflectometry system comprises an action of comparing information from light backscattered from a succession of transmitted light pulses to observe strain along the length of the fibre, and carrying out that action repeatedly so as to observe changes in strain over time.

8. The method of claim 7 further comprising deriving one or more vibration frequencies from the changes in strain over time.

9. The method of claim 8 further comprising comparing the derived vibration frequencies with a database of recorded vibration frequencies.

10. The method of claim 1 wherein the at least one optical fibre is secured to the rotary equipment.

11. The method of claim 10 wherein a surface end of the at least one optical fibre is anchored at or near surface and a downhole end of the at least one optical fibre is anchored at a downhole end of coiled tubing forming the elongate structure.

12. The method of claim 11 wherein the at least one optical fibre is loose between the surface and downhole ends of the coiled tubing.

13. The method of claim 1 further comprising operating the optical fibre as a communication link.

14. The method of claim 13 wherein operating the optical fibre as a communication link is carried out with one or more sensors connected to an electronics package to encode signals from the one or more sensors to light signals, and transmitting the light signals to the surface along the at least one optical fibre.

15. The method of claim 1 wherein a portion of the at least one optical fibre is wound helically around the exterior of the rotary equipment.

16. The method of claim 15 wherein the helically wound portion of the at least one optical fibre is disposed about a motor of the rotary equipment and covered with a shroud.

17. The method of claim 1 wherein the at least one optical fibre is a plurality of optical fibres.

18. The method of claim 1 wherein observing vibration created by the rotary equipment further includes detecting stall of the downhole motor and in response, reducing the weight on bit or lifting the elongate structure until the downhole motor restarts.

19. The method of claim 1 wherein observing vibration created by the rotary equipment includes transforming the time and location vibration data into frequency, location, and intensity data.

\* \* \* \* \*